United States Patent
Kim et al.

(10) Patent No.: US 11,364,578 B1
(45) Date of Patent: Jun. 21, 2022

(54) METHOD FOR ASSEMBLING BRAZING RING THROUGH PIPE SHRINKING AND EXPANDING PROCESS ON RETURN TUBE CONSTITUTING REFRIGERANT PASSAGE OF HEAT EXCHANGER

(71) Applicant: Ki Hong Kim, Gyeonggi-do (KR)

(72) Inventors: Ki Hong Kim, Gyeonggi-do (KR); Hyen Dong Kim, Gyeonggi-do (KR)

(73) Assignee: Ki Hong Kim, Gyeonggi-Do (KR)

( * ) Notice: Subject to any disclaimer, the term of this patent is extended or adjusted under 35 U.S.C. 154(b) by 0 days.

(21) Appl. No.: 17/540,352

(22) Filed: Dec. 2, 2021

(51) Int. Cl.
*B23P 15/26* (2006.01)
*F28F 9/26* (2006.01)
*B21D 53/06* (2006.01)
*B21D 39/04* (2006.01)

(52) U.S. Cl.
CPC ............ *B23P 15/26* (2013.01); *B21D 39/046* (2013.01); *B21D 53/06* (2013.01); *F28F 9/26* (2013.01)

(58) Field of Classification Search
CPC ......... Y10T 29/53113; Y10T 29/53122; Y10T 29/5185; B23P 15/26; B23P 19/02
See application file for complete search history.

(56) References Cited

U.S. PATENT DOCUMENTS

| | | | | |
|---|---|---|---|---|
| 4,683,649 A * | 8/1987 | Sbalchiero | ............... | B23P 19/04 29/714 |
| 4,698,904 A * | 10/1987 | Nozawa | ............... | B21D 53/085 414/744.2 |
| 4,734,969 A * | 4/1988 | Currier | ................ | B21D 53/085 29/890.047 |
| 4,901,416 A * | 2/1990 | McKinney | ........... | G01N 15/088 29/890.035 |
| 5,003,691 A * | 4/1991 | Milliman | ............. | B21D 53/085 269/45 |
| 5,220,722 A * | 6/1993 | Milliman | ............. | B21D 53/085 29/726 |
| 5,442,853 A * | 8/1995 | Vetter | ................... | B23P 19/022 29/523 |
| 6,164,517 A * | 12/2000 | Kim | .................. | B23K 35/0244 228/56.3 |

(Continued)

FOREIGN PATENT DOCUMENTS

| KR | 10-1380078 B1 | 4/2014 |
|---|---|---|
| KR | 10-1538346 B1 | 7/2015 |
| KR | 10-2016-0005278 A | 1/2016 |

OTHER PUBLICATIONS

Notice of Allowance dated Feb. 28, 2020 from Korean Patent Office in a counterpart Korean Patent Application No. 10-2018-0115054 (all the cited references are listed in this IDS.) (English translation of Abstract is also submitted herewith.)

*Primary Examiner* — Jason L Vaughan
(74) *Attorney, Agent, or Firm* — The PL Law Group, PLLC

(57) ABSTRACT

A method for assembling a brazing ring on a return tube constituting a refrigerant passage of a heat exchanger according to an embodiment of the present disclosure includes performing a pipe shrinking process on a straight portion of the return tube, coupling the brazing ring on the return tube through a return tube assembly device, and performing a pipe expanding process on the straight portion of the return tube to which the brazing ring is coupled. The coupling of the brazing ring on the return tube is performed using the return tube assembly device.

4 Claims, 4 Drawing Sheets

(56) References Cited

U.S. PATENT DOCUMENTS

| | | | | |
|---|---|---|---|---|
| 6,405,428 B1* | 6/2002 | Mun | ............... | F28D 1/0477 |
| | | | | 29/726 |
| 2009/0308583 A1* | 12/2009 | Dees | ............... | B21D 39/06 |
| | | | | 165/181 |
| 2010/0139094 A1* | 6/2010 | Branyon | ............... | B23K 1/00 |
| | | | | 29/890.043 |

* cited by examiner

METHOD FOR ASSEMBLING BRAZING RING THROUGH PIPE SHRINKING AND EXPANDING PROCESS ON RETURN TUBE CONSTITUTING REFRIGERANT PASSAGE OF HEAT EXCHANGER

BACKGROUND

1. Field

The present disclosure relates to a method for assembling a brazing ring for welding through a pipe shrinking and expanding process on a return tube constituting a refrigerant passage of a heat exchanger, and more particularly, to an enabling technology for stable assembly of a heat exchanger by pre-assembling a brazing ring for welding on a return tube constituting a refrigerant passage through a pipe shrinking and expanding process in the process of coupling a straight main tube and the return tube by brazing.

2. Description of the Related Art

A heat exchanger is a component that constitutes a heat exchange cycle and works as a condenser or evaporator to cool or heat a predetermined space using heat absorption or heat emission during heat exchange between a refrigerant flowing in the heat exchanger and an external fluid.

The heat exchanger is largely classified into a fin and tube type and a microchannel type according to its shape. The fin and tube type of heat exchanger includes a plurality of fins and a tube that passes through the fins, and the microchannel type of heat exchanger includes a flat tube and fins which are bent multiple times and provided in the flat tube. Additionally, the fin and tube type of heat exchanger and the microchannel type of heat exchanger involve heat exchange between a refrigerant flowing in the tube or the flat tube and an external fluid, and the fins play a role in increasing the heat exchange area between the refrigerant flowing in the tube or the flat tube and the external fluid.

In the heat exchanger, the metal tube serving as a flow channel of the refrigerant is arranged in a zigzag bent shape along a desired direction, and the plurality of heat dissipation fins is forcibly press-fit along the lengthwise direction of the metal tube and arranged at an equal distance. The heat dissipation fins have holes into which the metal tube is press-fit, and are connected in a manner of forcibly press-fitting the metal tube into the holes of the heat dissipation fins and stacked at an equal distance.

Meanwhile, a plurality of return tubes is used to connect the ends of adjacent metal tubes, and they play a role in connecting one end of each of a pair of metal tubes adjacent to each other to transfer the refrigerant flowing in any one metal tube to the other adjacent metal tube.

In general, the return tube is extrusion-molded into the same shape as the straight metal tube and bent to form an open curved shape like a horseshoe shape as a whole.

In the process of producing the heat exchanger, when the straight metal tube is connected to pass through the plurality of heat dissipation fins placed in an overlapping arrangement at a predetermined interval, the return tube is coupled onto the end of the metal tube via brazing, to form a continuous piping.

Meanwhile, to braze the return tube to a correct position of the straight metal tube, it is necessary to pre-assemble a brazing ring for welding on the return tube before performing the brazing task by applying heat to a coupling part.

For prior art documents which disclose technologies related to fabrication of the heat exchanger, a reference may be made to Korean Patent Nos. 10-1538346 and 10-1380078.

SUMMARY

The present disclosure is designed to solve the above-described related problem, and therefore the present disclosure is directed to providing a method for stably assembling a heat exchanger by pre-assembling a brazing ring for welding on a return tube through a pipe shrinking and expanding process in the process of coupling a main tube of a straight shape and the return tube of a curved shape constituting a refrigerant passage of a heat exchanger by brazing.

That is, in the process of assembling the brazing ring of a circular shape on the two sides of the return tube having a U-shaped curved shape, the brazing ring may be stably coupled by performing a pipe shrinking process on a straight portion that constitutes the two sides of the supplied return tube and performing a pipe expanding process after inserting the brazing ring.

To achieve the above-described object, a method for assembling a brazing ring on a return tube constituting a refrigerant passage of a heat exchanger according to the present disclosure includes: performing a pipe shrinking process on a straight portion of the return tube; coupling the brazing ring on the return tube through a return tube assembly device; and performing a pipe expanding process on the straight portion of the return tube to which the brazing ring is coupled, wherein the step of coupling the brazing ring on the return tube is performed using the return tube assembly device.

The return tube assembly device includes: a return tube supply unit to supply the return tube constituting the refrigerant passage; a brazing ring supply unit 20 to supply the brazing ring which is pre-assembled on the return tube; an assembly mounting unit 30 in which the return tube and the brazing ring supplied by the return tube supply unit and the brazing ring supply unit 20 are disposed; a first transfer module 40 to straightly move the return tube from the return tube supply unit onto the assembly mounting unit 30; a second transfer module 50 to transfer the brazing ring from the brazing ring supply unit 20 onto the return tube having moved to the assembly mounting unit 30; and a pressing module 60 to apply a pressing action on the return tube and the brazing ring transferred onto the assembly mounting unit 30 to carry out pre-assembly between the return tube and the brazing ring.

The second transfer module 50 includes a plurality of transfer rods which makes a front-rear motion along a same central axis in a repeated manner, and the plurality of transfer rods includes an inner transfer rod 52 having a circular cross section, and an outer transfer rod 56 which is disposed around the inner transfer rod 52 and makes a stretching and retraction motion along an axial direction of the inner transfer rod 52 in a repeated manner.

The first transfer module 40 includes: a return tube transfer rod 42 which makes a stretching and retraction motion to the assembly mounting unit 30 in a repeated manner; and a sliding bracket 44 which makes a stretching and retraction motion to the assembly mounting unit 30 in a repeated manner in such a state that the return tube transfer rod 42 is placed on top.

The step of coupling the brazing ring on the return tube includes: setting a movement path of the brazing ring by primary operation of the second transfer module 50; transferring the return tube onto the assembly mounting unit 30 by operation of the first transfer module 40; transferring the brazing ring along the movement path by secondary operation of the second transfer module 50, and coupling the transferred brazing ring on two sides of the return tube having a U shape; and pre-assembling the brazing ring on the return tube by applying pressure on the return tube and the brazing ring transferred onto the assembly mounting unit 30 through the pressing module 60.

The method for assembling the brazing ring for welding on the return tube constituting the refrigerant passage of the heat exchanger according to the present disclosure as described above achieves the precise and stable assembly between the return tube and the straight tube in the brazing process of the heat exchanger through pre-assembly of the brazing ring for welding on the U-shaped return tube in the process of coupling the return tube and the main tube constituting the refrigerant passage by brazing.

That is, in the process of assembling the brazing ring of a circular shape on the two sides of the return tube having a U-shaped curved shape, it is possible to achieve stable coupling of the brazing ring by performing a pipe shrinking process on the straight portion that constitutes the two sides of the supplied return tube and performing a pipe expanding process after inserting the brazing ring.

DETAILED DESCRIPTION

Figure 1:
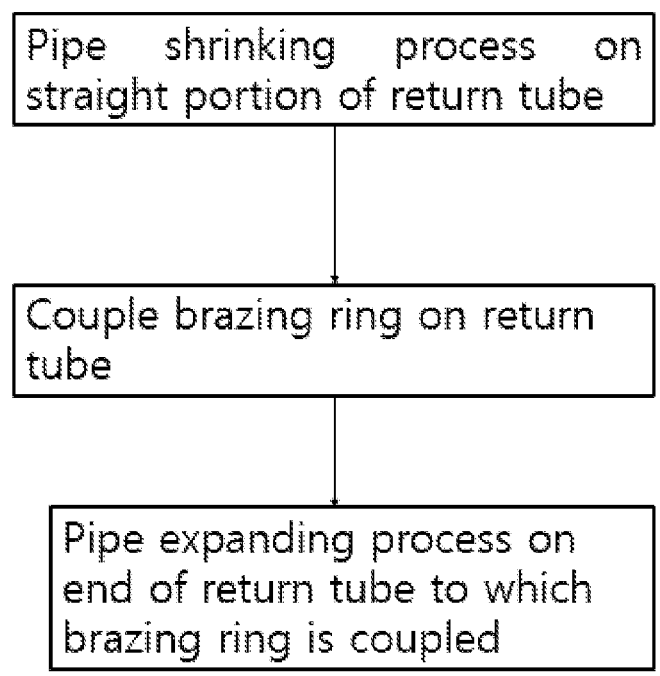
FIG. 1 shows an entire process of assembling a brazing ring through a pipe shrinking and expanding process on a return tube constituting a refrigerant passage according to the present disclosure.

Hereinafter, the embodiments of the present disclosure will be described in more detail with reference to the accompanying drawings. However, the present disclosure is not limited to the disclosed embodiments and will be embodied in a variety of different forms, and these embodiments are provided so that this disclosure will be thorough and complete, and will fully convey the scope of the present disclosure to those skilled in the art. In the drawings, like reference signs denote like elements.

In adding the reference signs to the elements in each drawing, it should be noted that like elements have like reference signs as possible although they are shown in different drawings. Additionally, in describing the present disclosure, when it is determined that a certain detailed description of relevant known elements or functions may obscure the subject matter of the present disclosure, its detailed description is omitted.

A return tube assembled according to the present disclosure is used to connect a pair of adjacent metal tubes arranged to pass through a plurality of heat dissipation fins arranged at an equal distance. That is, as the plurality of metal tubes that constitutes a heat exchanger is coupled in an unconnected state onto the plurality of heat dissipation fins, the return tube connects the plurality of metal tubes such that the metal tubes are in communication with each other to complete a flow channel function of a refrigerant as a whole.

In the process of assembling a brazing ring of a circular shape on a straight portion at the two sides of the return tube having a U-shaped curved shape, the present disclosure performs a pipe shrinking process on the straight portion to reduce the diameter of the end and then inserting the brazing ring, and performing a pipe expanding process on the end of the straight portion in such a state in which the brazing ring is inserted, to prevent the brazing ring from escaping, thereby achieving stable coupling of the brazing ring.

Hereinafter, a method for assembling a brazing ring on a return tube constituting a refrigerant passage of a heat exchanger according to the present disclosure will be described with reference to FIGS. 1 to 4.

Referring to FIG. 1, the entire process of assembling a brazing ring through a pipe shrinking and expanding process on a return tube constituting a refrigerant passage according to the present disclosure is shown.

First, a pipe shrinking process is performed on a straight portion of the return tube. The pipe shrinking process is performed so that the pair of straight portions 11 of the return tube 10 gradually narrow down to a smaller diameter as they go toward their ends. That is, the straight portion 11 has a tapered shape in which its diameter gradually decreases as it goes toward the end. Through this, it makes the coupling of the brazing ring easy.

Subsequently, the brazing ring is coupled on the return tube through a return tube assembly device of FIG. 3.

Subsequently, a pipe expanding process is performed on the straight portion of the return tube to which the brazing ring is coupled. That is, the straight portion has a tapered shape with the increasing diameter as it goes to the end with respect to the location at which the brazing ring is coupled.

Figure 3:
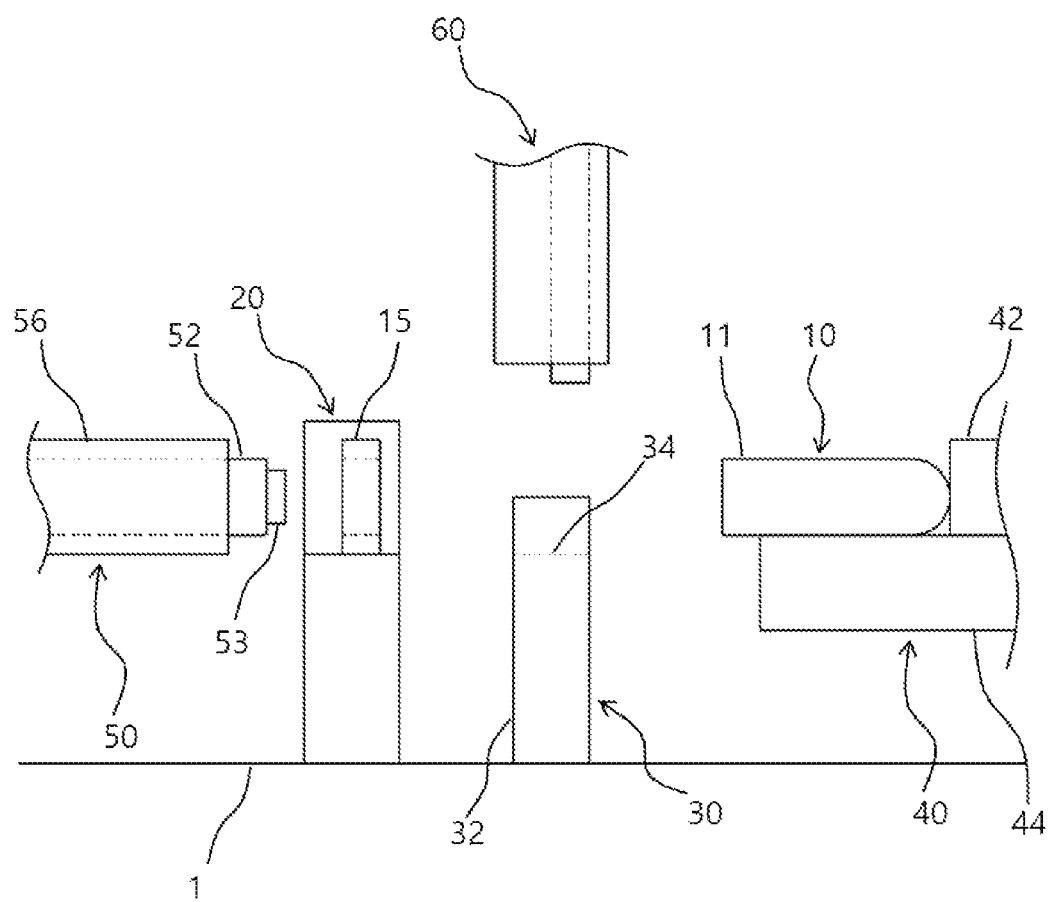
FIG. 3 is a conceptual diagram of a return tube assembly device according to an embodiment of the present disclosure.
Figure 4:
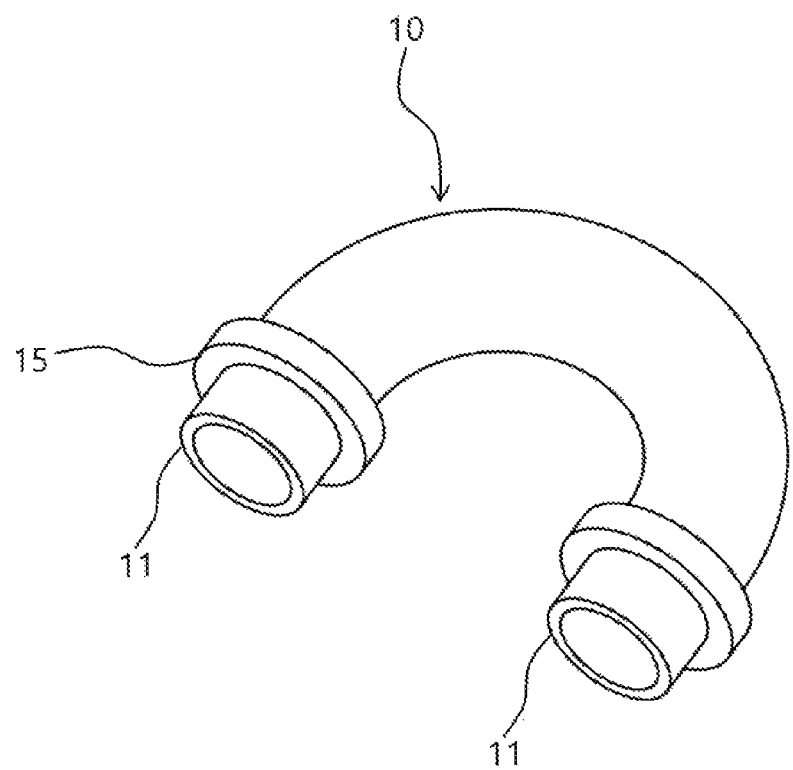
FIG. 4 is a diagram showing a brazing ring assembled on a return tube using a return tube assembly device according to the present disclosure.

Referring to FIG. 3, the return tube assembly device according to the present disclosure includes a return tube supply unit (not shown) to sequentially supply the return tube 10 having a U shape that constitutes the refrigerant passage of the heat exchanger, a brazing ring supply unit 20 to supply the brazing ring 15 which is pre-assembled on the return tube, an assembly mounting unit 30 in which the return tube and the brazing ring respectively supplied by the return tube supply unit and the brazing ring supply unit 20 are disposed, a first transfer module 40 to straightly move the return tube sequentially supplied by the return tube supply unit onto the assembly mounting unit 30, a second transfer module 50 to transfer the brazing ring sequentially supplied by the brazing ring supply unit 20 onto the return tube previously transferred to the assembly mounting unit 30, and a pressing module 60 to apply a pressing action on the return tube and the brazing ring transferred onto the assembly mounting unit 30 to pre-assemble the return tube and the brazing ring.

The return tube supply unit includes a return tube receiving hopper (not shown) in which the plurality of return tubes having a U shape is received, and a return tube movement pipe (not shown) to sequentially supply the plurality of return tubes stored in a line within the return tube receiving hopper onto the front end of the first transfer module 40.

The return tube movement pipe is positioned such that the upper end is coupled in communication with the side lower end or bottom of the return tube receiving hopper, and the lower end reaches the front side of the first transfer module 40. The return tube movement pipe may be fabricated to conform to the return tube of a U shape in cross section, and under the above-described structure, the plurality of return tubes moving in the stacked state within the return tube movement pipe are sequentially transferred in the stacked state toward the same direction.

The brazing ring supply unit 20 includes a brazing ring receiving hopper (not shown) in which the plurality of brazing rings 15 is received, and a brazing ring movement unit to sequentially supply the plurality of brazing rings stored in a line within the brazing ring receiving hopper onto the front end of the second transfer module 50.

Figure 2:
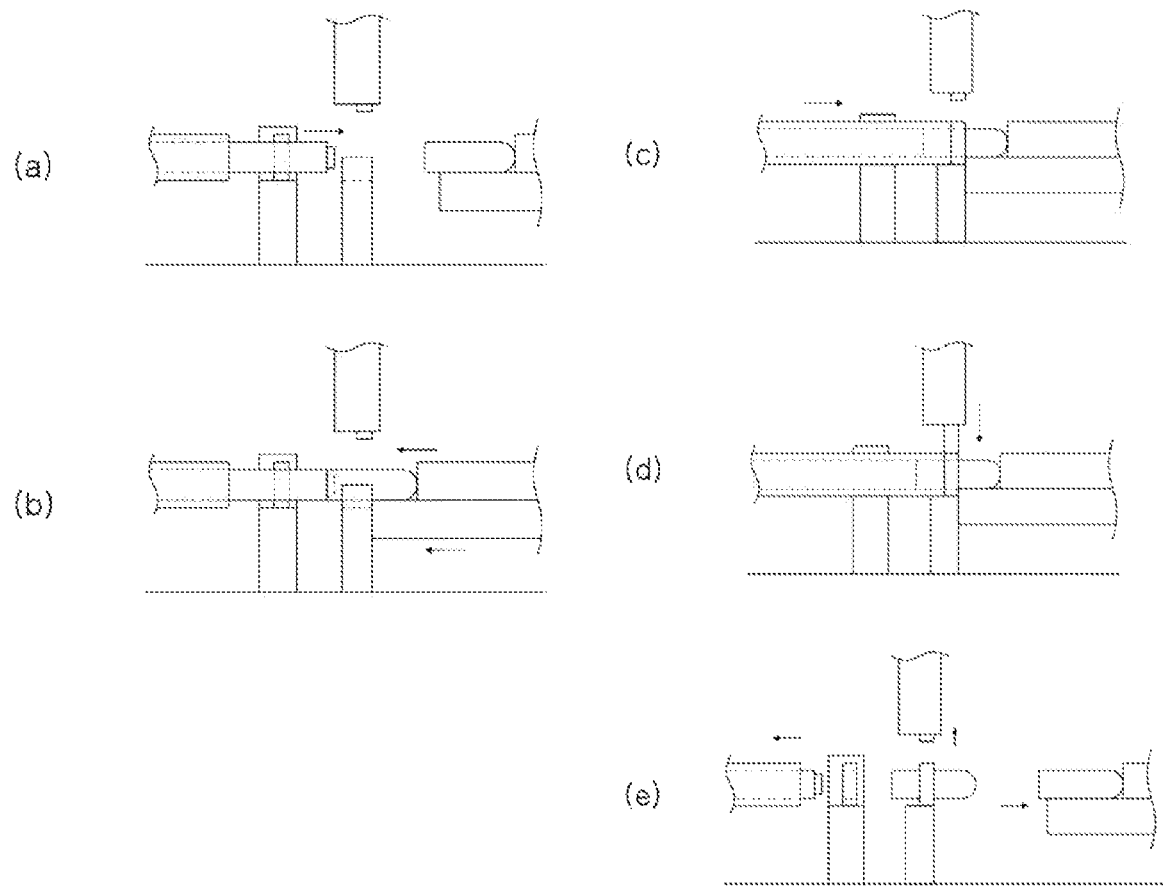
FIG. 2 shows an assembly process using a return tube assembly device.

The brazing ring movement unit is positioned such that the upper end is coupled in communication with the side lower end or bottom of the brazing ring receiving hopper, and the lower end reaches the front side of the second transfer module 50. FIG. 2 shows that the brazing ring receiving hopper is omitted, and the bottom of the brazing ring movement unit is positioned at the front end of the second transfer module 50.

The brazing ring movement unit may be fabricated to conform to the brazing ring having a circular ring shape in cross section, and under the above-described structure, the plurality of brazing rings moving in the stacked state within the brazing ring movement pipe is sequentially transferred in the stacked state.

The assembly mounting unit 30 corresponds to a structure installed on a base plate 1 that constitutes the base of the assembly device, and has a shaped horizontal cross section with open top and one side as a whole. Specifically, the assembly mounting unit 30 includes a mounting bracket 32 having a transfer module entry groove (not shown) formed to a predetermined depth on one side of a block having a cuboid shape, and a return tube seating groove 34 formed on top of the mounting bracket 32.

The first transfer module 40 is positioned in a direction facing the transfer module entry groove on the mounting bracket 32, and the second transfer module 50 is positioned on the opposite side to the first transfer module 40 with respect to the mounting bracket. That is, the mounting bracket is disposed on a line connecting the first transfer module 40 and the second transfer module 50. The pair of return tube seating grooves 34 is arranged in a line along a direction perpendicular to the imaginary line connecting the first and second transfer modules. The pair of return tube seating grooves 34 is where the pair of straight portions 11 that constitute the return tube 10 is placed, and has a shape of a groove having a semicircular shape.

The first transfer module 40 includes a return tube transfer rod 42 which makes a stretching and retraction motion from the lower end of the return tube supply unit to the assembly mounting unit 30 in a repeated manner, and a sliding bracket 44 which makes a stretching and retraction motion to the assembly mounting unit 30 in a repeated manner in such a state in which the return tube transfer rod 42 is placed thereon. The sliding bracket 44 includes a bracket plate on which the return tube transfer rod 42 is slidably placed and a pair of bracket guides formed in the upward direction from the two sides of the bracket plate. The sliding bracket has a cross section shape. The return tube transfer rod 42 is placed on top of the bracket plate between the pair of bracket guides.

Describing the process of supplying the return tube, the return tube 10 and the return tube transfer rod 42 placed on the sliding bracket 44 are transferred to the assembly mounting unit 30 at the same time through the operation of an actuator, and only the return tube transfer rod 42 moves by separate power from the actuator to further advance the return tube.

That is, after the return tube and the return tube transfer rod 42 are transferred together until the sliding bracket 44 reaches the inner surface of the transfer module entry groove of the mounting bracket, the sliding bracket 44 stays stopped, and the return tube and the return tube transfer rod 42 make an additional movement through separate power.

When the sliding bracket 44 is coupled to the mounting bracket, the top of the bracket guide may have a higher position than the top of the mounting bracket.

In the above-described state, the straight portion that constitutes the two sides of the supplied return tube is spaced a predetermined distance above apart from the return tube seating groove. This is to create a space for entry of the brazing ring that will be coupled onto the straight portion of the return tube afterwards. That is, when the return tube into which the brazing ring is inserted is disposed on the return tube seating groove, an external force is applied using the pressing module 60 to pre-assemble the brazing ring on the return tube.

The second transfer module 50 includes a plurality of transfer rods that makes a front-rear motion along the same central axis in a repeated manner. The plurality of transfer rods includes an inner transfer rod 52 having a circular cross section which makes a stretching and retraction motion from the lower end of the brazing ring supply unit 20 to the assembly mounting unit 30 in a repeated manner, and an outer transfer rod 56 which is disposed around the inner transfer rod 52 and makes a stretching and retraction motion along the axial direction of the inner transfer rod 52 in a repeated manner. A pair of inner transfer rods 52 and a pair of outer transfer rods 56 are prepared to supply the pair of brazing rings.

When the inner transfer rod 52 has a cylindrical rod shape with a smaller diameter than the inner diameter of the brazing ring, a rod protrusion 53 is formed at the front end of the inner transfer rod 52 to have a smaller diameter than the inner diameter of the return tube.

When the inner transfer rod 52 is stretched to the assembly mounting unit 30 through the brazing ring fixed to the bottom of the brazing ring supply unit 20 by the operation of the actuator, the brazing ring fixed to the bottom of the brazing ring supply unit 20 is unfixed, and then the outer transfer rod 56 is operated by the operation of the actuator to slidably move the unfixed brazing ring to the assembly mounting unit 30.

The pressing module 60 is positioned above the mounting bracket 32, and forces the pressing rod to make a motion along the downward direction to apply a strong strike onto a coupling position of the return tube and the brazing ring placed on the return tube seating groove in order to carry out pre-assembly between the return tube and the brazing ring. The lower end of the pressing rod may have a radial shape suitable for the outer diameter of the brazing ring, and when coupled with the return tube seating groove having a radial shape, has a circular shape which is a cross section shape of the brazing ring as a whole.

Hereinafter, a process of assembling the brazing ring on the return tube constituting the refrigerant passage of the heat exchanger using the return tube assembly device according to the present disclosure will be described with reference to FIG. 2.

First, referring to (a) of FIG. 2, the inner transfer rod 52 of the second transfer module 50 passes through the brazing ring fixed to the bottom of the brazing ring supply unit 20 and is stretched to the assembly mounting unit 30 by the operation of the actuator. The rod protrusion 53 at the front end of the inner transfer rod 52 is disposed in front of the return tube seating groove formed on top of the mounting bracket.

Referring to (b) of FIG. 2, the return tube and the return tube transfer rod 42 placed on the sliding bracket 44 are transferred to the assembly mounting unit 30 at the same time by the operation of the actuator, and only the return tube transfer rod 42 moves by separate power from the actuator to further advance the return tube.

Through the above-described process, the rod protrusion 53 at the front end of the inner transfer rod 52 is inserted into the two straight portions of the return tube supplied onto the mounting bracket.

Referring to (c) of FIG. 2, when the inner transfer rod 52 is separably coupled with the return tube, the outer transfer rod 56 is operated by the operation of the actuator to allow the brazing ring to slidably move to the assembly mounting unit 30 along the inner transfer rod 52. The transferred brazing ring remains inserted into the straight portion of the return tube.

Subsequently, referring to (d) of FIG. 2, the pressing module 60 positioned above the mounting bracket is forced to make a motion along the downward direction to apply a strong strike onto a coupling position of the return tube and the brazing ring placed on the return tube seating groove in order to carry out pre-assembly between the return tube and the brazing ring.

Subsequently, as shown in (e) of FIG. 2, when the return tube on which the brazing ring is pre-assembled is stably temporarily coupled to the end of the plurality of metal tubes coupled on the plurality of heat dissipation fins, firm fixing is accomplished by brazing with high temperature heat.

The method for assembling the brazing ring for welding on the return tube constituting the refrigerant passage of the heat exchanger according to the present disclosure as described above achieves precise and stable assembly between the return tube and the straight tube in the brazing process of the heat exchanger by pre-assembling the brazing ring for welding on the return tube having a U shape in the process of coupling the return tube and the main tube constituting the refrigerant passage by brazing. That is, in the process of assembling the brazing ring of a circular shape on the two sides of the return tube having a U-shaped curved shape, it is possible to achieve stable coupling of the brazing ring by performing a pipe shrinking process on the straight portion that constitutes the two sides of the supplied return tube and performing a pipe expanding process after inserting the brazing ring.

The foregoing description is made to describe the technical spirit of the present disclosure for illustrative purposes, and a variety of modifications and change may be made by those skilled in the art without departing from the essential features of the present disclosure. Therefore, the embodiments disclosed herein are provided to describe the technical spirit of the present disclosure and not intended to be limiting, and the technical spirit and scope of the present disclosure is not limited by the embodiments. The scope of protection of the present disclosure should be interpreted by the appended claims, and it should be interpreted that the scope of protection of the present disclosure covers all the technical spirit within the equivalent scope.

What is claimed is:

1. A method for assembling a brazing ring on a return tube constituting a refrigerant passage of a heat exchanger, the method comprising:
    performing a pipe shrinking process on a straight portion of the return tube;
    coupling the brazing ring on the return tube through a return tube assembly device; and
    performing a pipe expanding process on the straight portion of the return tube to which the brazing ring is coupled,
    wherein the coupling of the brazing ring on the return tube is performed using the return tube assembly device; and
    the return tube assembly device includes:
    a return tube supply unit to supply the return tube constituting the refrigerant passage;
    a brazing ring supply unit to supply the brazing ring which is pre-assembled on the return tube;
    an assembly mounting unit in which the return tube and the brazing ring supplied by the return tube supply unit and the brazing ring supply unit are disposed;
    a first transfer module to straightly move the return tube from the return tube supply unit onto the assembly mounting unit;
    a second transfer module to transfer the brazing ring from the brazing ring supply unit onto the return tube having moved to the assembly mounting unit; and
    a pressing module to apply a pressing action on the return tube and the brazing ring transferred onto the assembly mounting unit to carry out pre-assembly between the return tube and the brazing ring.

2. The method of claim 1, wherein the second transfer module includes a plurality of transfer rods which makes a front-rear motion along a same central axis in a repeated manner; and
    the plurality of transfer rods includes an inner transfer rod having a circular cross section, and an outer transfer rod which is disposed around the inner transfer rod and makes a stretching and retraction motion along an axial direction of the inner transfer rod in a repeated manner.

3. The method of claim 1, wherein the first transfer module includes:
    a return tube transfer rod which makes a stretching and retraction motion to the assembly mounting unit in a repeated manner; and
    a sliding bracket which makes a stretching and retraction motion to the assembly mounting unit in a repeated manner in such a state that the return tube transfer rod is placed on top.

4. The method of claim 1, wherein the coupling of the brazing ring on the return tube comprises:
    setting a movement path of the brazing ring by primary operation of the second transfer module;
    transferring the return tube onto the assembly mounting unit by operation of the first transfer module;
    transferring the brazing ring along the movement path by secondary operation of the second transfer module, and coupling the transferred brazing ring on two sides of the return tube having a U shape; and
    pre-assembling the brazing ring on the return tube by applying pressure on the return tube and the brazing ring transferred onto the assembly mounting unit through the pressing module.

* * * * *